(12) United States Patent
Barbee et al.

(10) Patent No.: US 7,895,168 B2
(45) Date of Patent: Feb. 22, 2011

(54) DATA MINING USING VARIABLE RANKINGS AND ENHANCED VISUALIZATION METHODS

(75) Inventors: Steven G. Barbee, Amenia, NY (US); Benjamin R. Chu, Austin, TX (US); John W. Hopkins, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 11/971,462

(22) Filed: Jan. 9, 2008

(65) Prior Publication Data

US 2009/0177682 A1 Jul. 9, 2009

(51) Int. Cl.
G06F 17/00 (2006.01)
(52) U.S. Cl. ............ 707/694; 707/687; 707/688; 707/689
(58) Field of Classification Search ............ 707/694, 707/687–689
See application file for complete search history.

(56) References Cited

U.S. PATENT DOCUMENTS 6,651,049 B1 * 11/2003 Agrawal et al. .......... 707/694

| 2003/0145000 | A1 | 7/2003 | Arning et al. | |
|---|---|---|---|---|
| 2006/0010093 | A1 | 1/2006 | Fan et al. | |
| 2007/0011135 | A1 | 1/2007 | Chitgupakar et al. | |
| 2007/0011187 | A1 | 1/2007 | Chitgupakar et al. | |
| 2007/0011188 | A1 | 1/2007 | Chitgupakar et al. | |
| 2008/0085352 | A1* | 4/2008 | Meijer et al. ............ | 426/559 |
| 2009/0315891 | A1* | 12/2009 | Lesser et al. ............ | 345/440 |

* cited by examiner

Primary Examiner—Sana Al-Hashemi
(74) Attorney, Agent, or Firm—Cantor Colburn LLP; Ian MacKinnon

(57) ABSTRACT

Dimensional data with attributed categorical variables is mined against a continuous target with any data mining method by ranking variables. The ranked variables are used to generate a tree. A population and a target value, obtained from a top node of the tree, are stored. The top node is removed from the tree to create a new tree with a next top node. Obtaining and storing a next population and a next target value for the next top node, and removing the top node or top field to create a new tree, are repeated. The listing of sequential top node parameters is plotted on a tree cusp curve that provides a graphical user interface enabling identification of a field which affect a greatest or a least number of records, based upon a magnitude of departure of the field from a norm.

20 Claims, 13 Drawing Sheets

| TREE | NODE ID | SCORE | RECORD COUNT (% OF ALL) |
|---|---|---|---|
| ○ TRUE | 1 | 73.418... | 8154 (100%) |
| ├─⊛ ((EQP_D39=JS06) OR (EQP_D39=JN03) OR (EQP_D39=JS05)) | 1.1 | 71.506... | 5021 (62%) |
| └─○ ((EQP_D39≠JS06) AND (EQP_D39≠JN03) AND (EQP_D39≠JS05)) | 1.2 | 76.482... | 3133 (38%) |

*FIG. 3A*

DATA MINING USING VARIABLE RANKINGS AND ENHANCED VISUALIZATION METHODS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to data mining and, more particularly, to exploratory data mining using chi-squared variable rankings and enhanced visualization methods.

2. Description of Background

A single data mining method that works best in all possible scenarios has yet to be discovered. In order to address a particular data mining problem, it may be necessary to select an appropriate data mining method from a myriad of available alternatives. Unfortunately, scientific approaches for selecting an appropriate method are lacking. Selections are typically based upon experience, familiarity, personal preference, or commercial availability. Whereas a wide variety of data mining methods are known, only some of these methods are available as software applications from commercial sources. In view of the foregoing factors, only a few methods are routinely applied to all data mining problems at hand.

Data mining methods may be applied to any of a plurality of verticals such as banking, insurance, marketing, or manufacturing. However, for illustrative purposes, data mining will be described hereinafter in the context of manufacturing. A properly selected data mining method enables timely identification of indications of problems or data patterns, for instance, poor yield in a manufacturing line that may involve a multitude of tools and processes. Selection of an appropriate method is critically important in the context of many operational environments, particularly those involving shallow, highly dimensional datasets containing greater than approximately 200 variables but with records, or instances, that number less than approximately 10 times the number of variables. For example, in semiconductor processing, the selected data mining method must be capable of implementing a variable ranking technique for mining logistics data pertaining to processes, tools, and chambers against semiconductor manufacturing parameters such as limited yields and inline test parameters. This mined logistics data is utilized to routinely evaluate the contributions of at least 400 process steps with anywhere from 2 to 10 or more tools per process against perhaps only 200 to 2,000 wafers to find the most likely process, tool, and chamber (or their combinations) that contribute to a problem being mined. It is apparent that these data mining methods go far beyond anything discoverable with conventional statistical hypothesis testing.

Existing data mining methods provide insufficient user flexibility for evaluating and iteratively determining the most effective data mining approach for a given operational setting. More specifically, many existing methods do not permit selection of a variable ranking method, and many do not permit changing the rankings of data mining results. Consider, for example, the Intelligent Miner For Data (IM4D) data mining workbench application previously offered by IBM. IM4D offers a selection of several data mining methods including radial basis functions (RBFs), neural prediction, and bivariate prediction. Some of the data mining methods offered by IM4D allow the selection of a variable ranking method such as chi-squared versus entropy, but this capability is not provided if one wishes to use IM4D to implement a classification tree or perform neural classification.

Another shortcoming of existing data mining methods is that they do not provide a graphical user interface that enable users to accurately assess the significance of mining results. When assessing mining results from a classification tree, it is often difficult or impossible to determine the top ten (or top x) most significant results, where x is an integer from 1 to 100. Typically, the top one or two nodes from the tree are given after possibly weeding out a few maverick results that have an extreme value but are associated with few records. Another approach is to sequentially remove the top node (or $2^{nd}$ nodes), repeatedly acquiring results. Even here, it is difficult to judge by eye which results are the most significant. Yet another approach is to create a full tree all the way out to the leaf nodes, count the number of times a field (variable) is used in a node, and then rank the variables. The problem with this approach is that each node represents a smaller population so it is easy to misrepresent what is important for an entire dataset when finding the best field to split a node in a far or remote region of the entire dataset.

A need therefore exists for improved data mining methods. A solution that addresses, at least in part, the above and other shortcomings is desired.

SUMMARY OF THE INVENTION

Embodiments of the invention include methods and computer program products for performing data mining on a numeric target variable, using rankings of highly-attributed categorical variables and enhanced visualization methods. Data mining is performed using any method which can provide a list of key variables. Any tree mining method is then used to generate a diagram from the mined data. A population and a target numeric value are obtained from a top node, branch or field of the tree diagram. The population and the target numeric value are stored by appending the population and the target numeric value to a listing of sequential top node parameters. The top node or top field is removed from the tree mining method which then creates a new tree diagram with a next top node or a next top field. Obtaining a next population and a next target value for the next top node or the next top field, appending the next population and the next target value to the listing of sequential top node parameters, and removing the top node or top field from the new tree diagram, are repeated until the new tree diagram does not contain any more nodes or fields. The listing of sequential top node parameters is plotted on a tree cusp curve using at least one of a left branch of the tree cusp curve or a right branch of the tree cusp curve. The tree cusp curve provides a graphical user interface enabling visual identification of one or more fields which affect a greatest number of records, or one or more fields which affect a least number of records, based upon a magnitude of departure of the one or more fields from a norm as displayed on the tree cusp curve.

Pursuant to a set of further embodiments, data mining is performed using at least one of a radial basis function network, neural network, or a support vector machine. Rankings of highly-attributed categorical variables is performed using a chi-squared method for ranking each of a plurality of variables.

The computer program products for performing data mining using rankings of highly-attributed categorical variables and enhanced visualization methods include a storage medium readable by a processing circuit and storing instructions for execution by the processing circuit for facilitating a method. The method includes mining data using a method for ranking each of a plurality of variables. A tree diagram is generated from the mined data using any tree mining method suitable for a numeric target with categorical predictor variables. A population and a target value are obtained from a top node or a top field of the tree diagram. The population and the target value are stored by appending the population and the target value to a listing of sequential top node parameters. The top node or top field is removed from the variables mined by the tree mining method to create a new tree diagram with a next top node or a next top field. Obtaining a next population and a next target value for the next top node or the next top field, appending the next population and the next target value to the listing of sequential top node parameters, and removing the top node or top field from the variables used to obtain the new tree diagram, are repeated until the new tree diagram does not contain any more nodes or fields. The listing of sequential top node parameters is plotted on a tree cusp curve using at least one of a left branch of the tree cusp curve or a right branch of the tree cusp curve. The tree cusp curve provides a graphical user interface enabling visual identification of one or more fields which affect a greatest number of records, or one or more fields which affect a least number of records, based upon a magnitude of departure of the one or more fields from a norm as displayed on the tree cusp curve.

Pursuant to a set of further embodiments, data mining is performed using at least one of a radial basis function network, neural network, or a support vector machine. Rankings of highly-attributed categorical variables is performed using a chi-squared method for ranking each of a plurality of variables.

Other methods and computer program products according to embodiments will be or become apparent to one with skill in the art upon review of the following drawings and detailed description. It is intended that all such additional methods and computer program products be included within this description, be within the scope of the present invention, and be protected by the accompanying claims.

BRIEF DESCRIPTION OF THE DRAWINGS

Referring now to the drawings, wherein like elements are numbered alike in the several FIGURES:

FIGS. 3A-3B illustrate exemplary tree diagrams for use in conjunction with the methods of FIG. 3.

The detailed description explains the preferred embodiments of the invention, together with advantages and features, by way of example with reference to the drawings.

DETAILED DESCRIPTION OF THE INVENTION

In the following description, details are set forth to provide an understanding of the invention. In some instances, certain software, circuits, structures and methods have not been described or shown in detail in order not to obscure the invention. The term "data processing system" is used herein to refer to any machine for processing data, including the client/server computer systems and network arrangements described herein. The present invention may be implemented in any computer programming language provided that the operating system of the data processing system provides the facilities that may support the requirements of the present invention. The invention may be implemented with software, firmware, or hardware, or any of various combinations thereof.

Figure 1A:
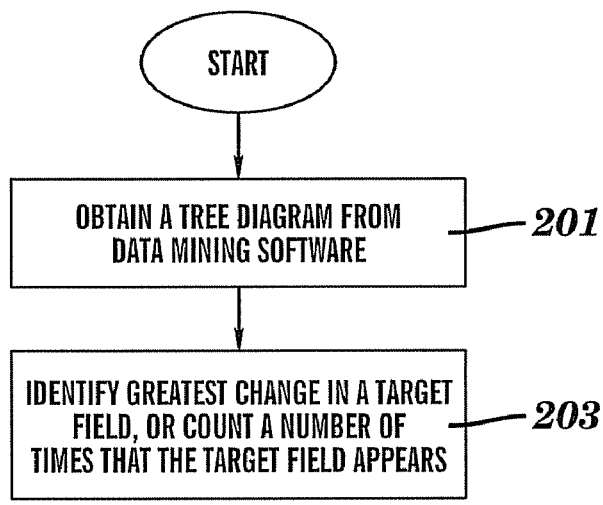
FIGS. 1A and 1B are flow diagrams describing prior art methods for performing data mining using tree methods and diagrams.
Figure 1B:
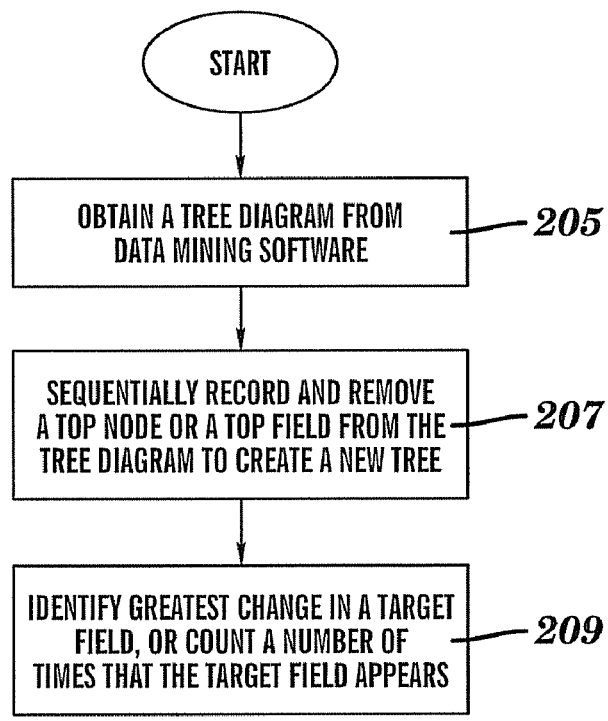

FIGS. 1A and 1B are flow diagrams describing prior art methods for performing data mining using tree diagrams. The procedure of FIG. 1A commences at block 201 where a tree diagram is obtained from data mining software. Next, a greatest change in a target field is identified, or a number of times that the target field appears is counted (block 203). This approach is disadvantageous in that important fields or combinations of fields may be overlooked.

The procedure of FIG. 1B commences at block 205 where a tree diagram is obtained from data mining software. Next, a top node or field of the tree diagram is sequentially recorded and removed from the tree diagram to create a new tree and to find a next most important variable (block 207). The term "sequentially" refers to the fact that block 207 is recursively or repeatedly performed for each of a plurality of top node or field removals from the tree diagram. Block 207 is repeated to completion among a plurality of variables in the tree diagram. At block 209, a greatest change in a target field is identified, or a number of times that the target field appears is counted. As with the procedure of FIG. 1A, the procedure of FIG. 1B is disadvantageous in that important fields or combinations of fields may be overlooked.

Figure 2:
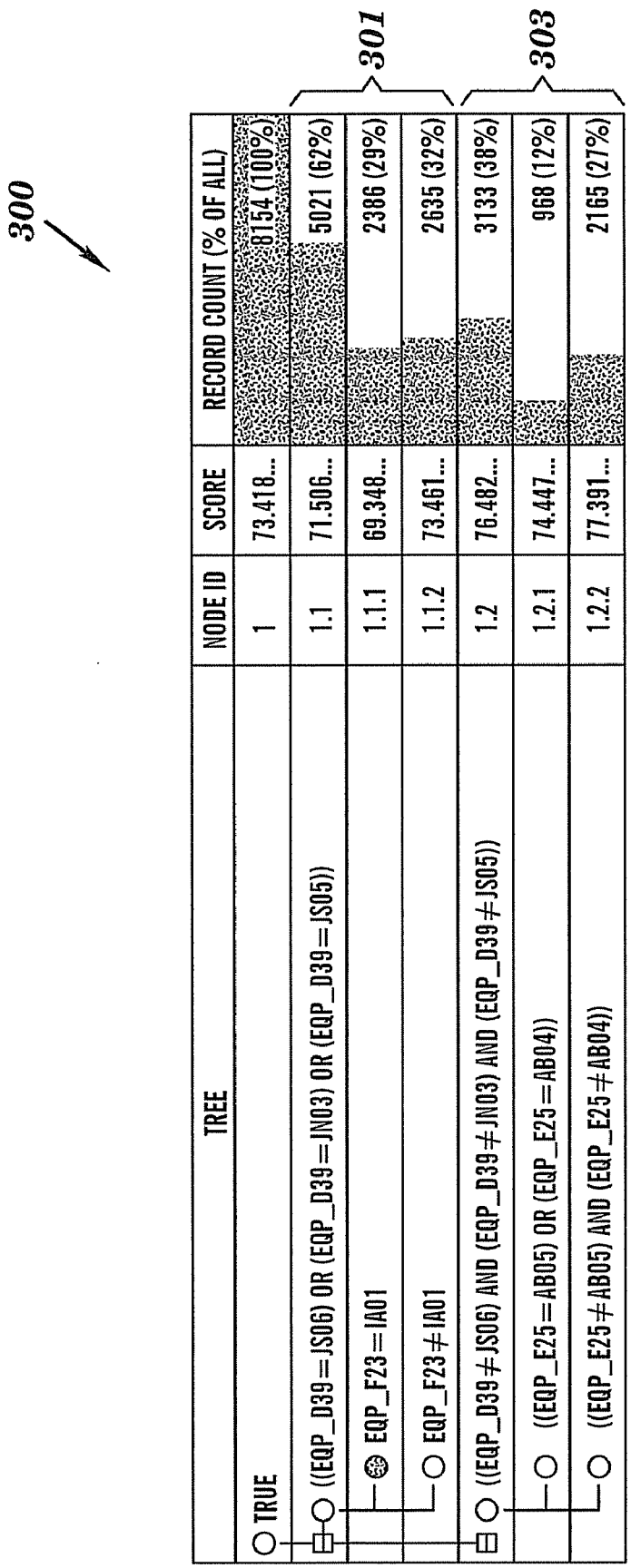
FIG. 2 illustrates a prior art tree diagram for use with any of the methods of FIG. 1A or 1B.

FIG. 2 illustrates a prior art tree diagram for use with any of the methods of FIG. 1A or 1B. A tree 300 includes a first set of nodes 301 that represent strongest nodes above average. The tree 300 also includes a second set of nodes 303 that represent strongest nodes below average. Decision tree methods are very popular among, and a mainstay of, data miners. Pursuant to conventional approaches, the data in the tree 300 would be split two or more ways at each node or branch in the tree 300 according to which variable best separates them by one of various criteria (e.g. Information Gain, Gain ratio, etc).

An inherent drawback of this approach is that the dataset is reduced in size after each split, so the significance of such variables is pertinent only to the sub-branch which it separates. According to this conventional approach, the splitting continues down to the final leaves of the tree 300.

Figure 3B:
Figure 4:
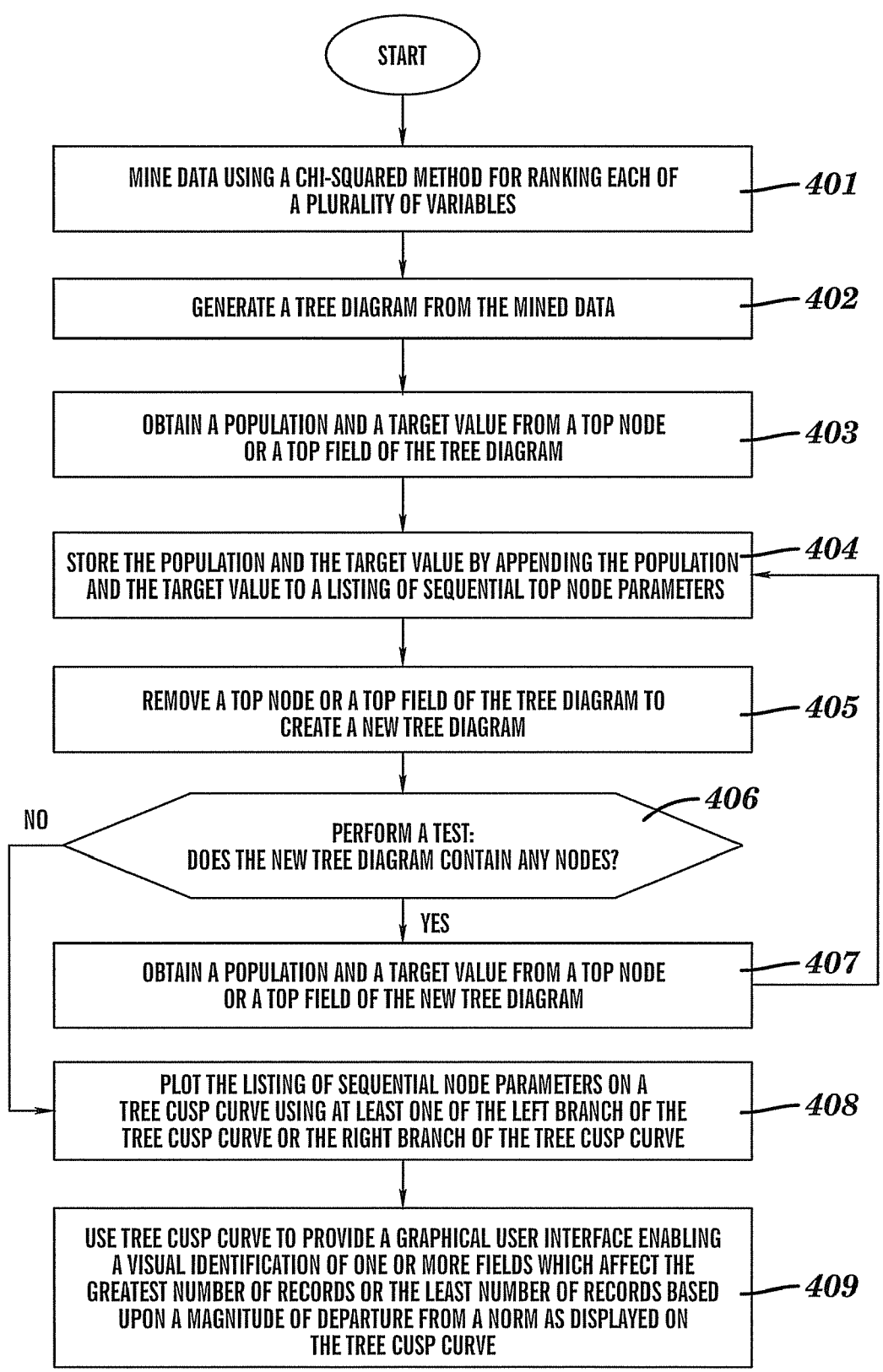
FIG. 4 is a flow diagram describing exemplary methods for performing exploratory data mining using chi-squared variable rankings and enhanced visualization techniques.

FIGS. 3A-3B illustrate exemplary tree diagrams for use in conjunction with the methods of FIG. 4 pursuant to various exemplary embodiments of the invention disclosed herein. It is recognized that the variable splitting the top node of FIG. 2 is the variable of primary interest. Accordingly, with reference to FIGS. 3A and 3B, the tree 300 of FIG. 2 is not processed in the conventional way as described in the preceding paragraph, but instead is run as a stump where one is primarily interested in obtaining information from the top node or field. This information includes node parameters such as a population 108 (FIG. 6, to be described in greater detail hereinafter) and a target value 107 associated with the top node or field. The population 108 may represent a quantity or number of records, and the target value 107 may represent a measured parameter. That top node or field is then eliminated from a set of input fields and another stump is run. In this way, a listing of sequential top node parameters is provided from the tree 300 of FIG. 2 as indicated with reference to FIGS. 3A and 3B.

Figure 5:
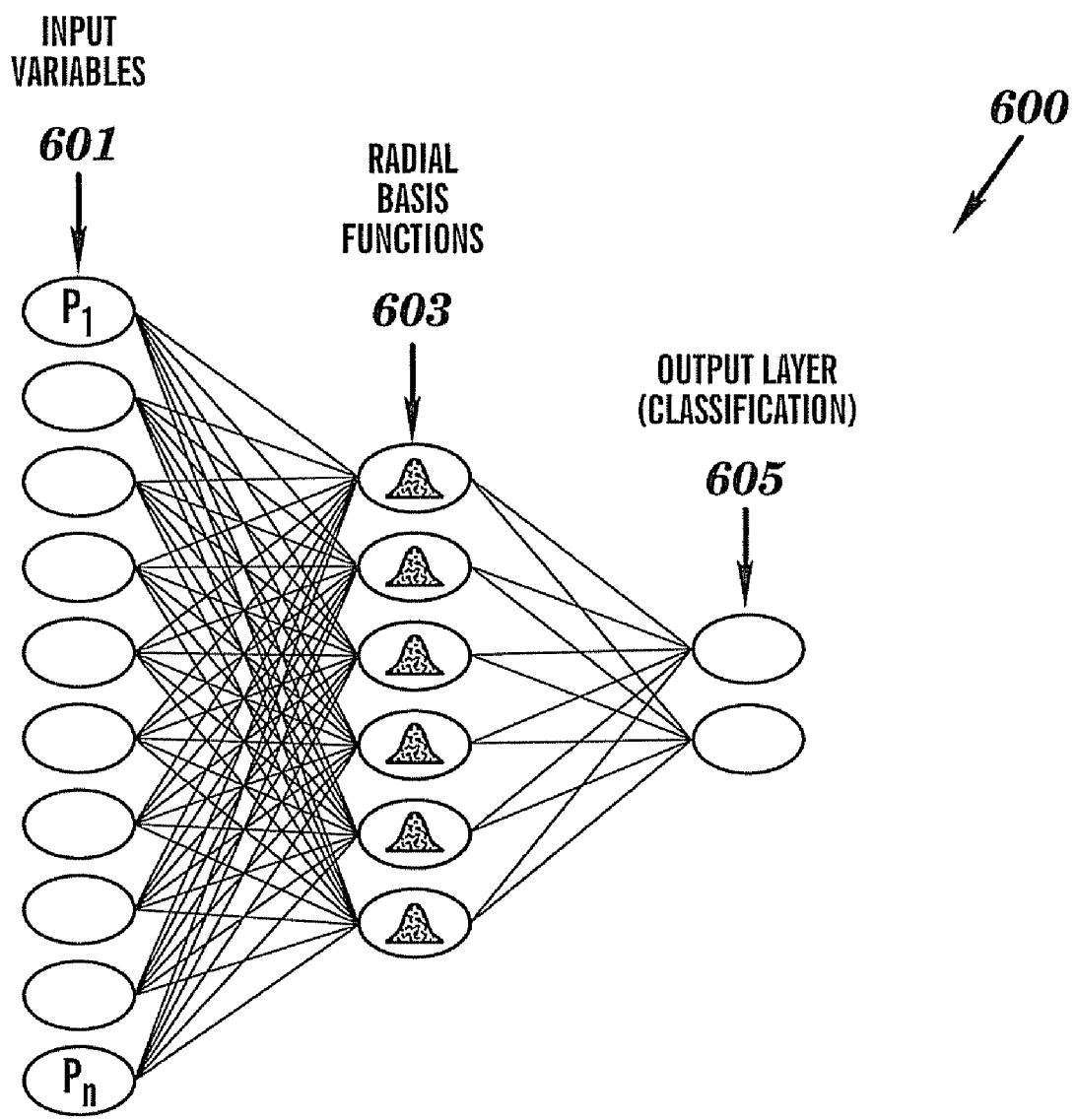
FIG. 5 is an architectural block diagram showing an illustrative radial basis function network which may be employed in conjunction with the procedure of FIG. 4.

A first sequential node 305 obtained from the tree 300 of FIG. 2 is shown in FIG. 3A, and a second sequential node 307 obtained from the tree 300 of FIG. 2 is shown in FIG. 3B. The first sequential node 305 (FIG. 3A) shows a first or top node tree stump that is obtained from a dataset using a chi-squared feature selection technique illustratively implemented by a four-region radial basis function network (RBFN). Chi-squared feature selection and RBFNs are described in greater detail hereinafter with reference to FIGS. 4 and 5. Referring now to FIG. 3B, the second sequential node 307 is obtained by eliminating the first sequential node 305, or the fields contained therein, or both, from the tree 300 (FIG. 2), such that the second sequential node 307 is now the new top node.

The procedure described with reference to FIGS. 3A and 3B may be referred to as forming tree stumps. One may continue in the manner indicated with reference to FIGS. 3A and 3B until all of the features of the tree 300 (FIG. 2) as generated by the chi-squared feature selection technique have been exhausted with many tree stumps formed. These tree stumps include a plurality of sequential nodes such as the first sequential node 305, the second sequential node 307, and typically a number of additional sequential nodes as well. Basically, the process illustrated in FIGS. 3A and 3B involves sequentially removing a field or top node of the tree diagram. After the tree 300 of FIG. 2 is formed using data mining software, one or more node parameters from the top node are recorded (see first sequential node 305, FIG. 3A) and then the top node is removed and the tree method is applied again (see second sequential node 307, FIG. 3B) to find the next most important variable. Repeating this to completion among the variables creates a hierarchy of rules ranked by their importance. With hundreds of variables, this procedure may be performed only after a feature selection method, such as chi squared, reduces the number of variables down to a more manageable dataset.

In an illustrative operational environment of semiconductor fabrication, if a manufacturing engineer, device yield engineer or other individual suspects that there is a process-to-process interaction between tools, such as between a lithography tool and a subsequent etching process tool, then it would be useful to retain two levels in each tree for the engineer or other individual to peruse. This could be performed for each tree but the "stump" single-node tree could not be used. In IM4D, by setting the number of levels to 2, such 2-node trees are easily produced. When a "match" to intuition or experience is made by the engineer or other individual between the top node and second node variables (processes), then both process variables (top and $2^{nd}$ nodes) of the tree should be added to a pool of variables before proceeding with the sequential elimination of top nodes as described in the section above.

In this case, matches are processes that are strongly related in the formation of a device feature that can directly or indirectly affect the electrical parameter used as the target. As mentioned, a common interaction of variables is for the definition of a feature which involves photolithographically defining the shape's boundary features and a subsequent etching step that reproduces the photolithographically-defined pattern into an underlying film. The degree of exactness of the pattern transfer down to the base of the underlying film depends on how vertical (anisotropic) the walls of the pattern are. The process variables of the etching process can strongly affect this anisotropy. The feature dimensions at the base of the film may define the region for doping the underlying silicon comprising the active device region (e.g. the gate channel) and therefore is of paramount importance in device performance (e.g. speed of switching for gate length).

An example of a rule for multiple process tools would be:

If tools JS06, JN03, or JS05 are used at the D39 process step
AND
If tool IA01 is used at the F23 step
THEN C = 69.348 for 2,386 wafers (29% of the entire population)

The electrical parameter is reduced in value by 5.5% from the overall mean for 29% of the wafers. The interaction of D39 with F23 may make sense to the engineer. This is shown in FIG. 2 with reference to Node ID 1.1.1.

FIG. 4 is a flow diagram describing exemplary methods for performing exploratory data mining using chi-squared variable rankings and enhanced visualization techniques. The procedure commences at block 401 where data is mined using a chi-squared method for ranking each of a plurality of categorical logistics variables to perform feature selection. Block 401 can also be performed using a method that is similar, but not identical, to the chi-squared method, or performed using a method that is closer to the chi-squared method than to an entropy method as described hereinafter.

Simply stated, the chi-squared method, $\chi^2$, compares expected to observed values. The chi-squared ranking is based on ranking different variables by the sum of squares their attributes' departure of observed (O) values from their expected (E) value divided by the expected value:

$$\chi^2 = \sum \frac{(O-E)^2}{E}$$

For the following impurity-based splitting criteria, the following nomenclature and definition holds: given a training set, S, these are the probabilities of the target feature, y:

$$P_y(S) = \left( \frac{|\sigma_{y=c_1} S|}{|S|}, \ldots, \frac{|\sigma_{y=c_{dom(y)}} S|}{|S|} \right)$$

where $\sigma_{y=c_1} S$ indicates the subset of instances in S for which the feature $y=c_1$, or the first instance and dom(y) is the entire domain of features, y.

In contrast to chi-squared methods, entropy methods comprise an alternative method for ranking variables. For purposes of the present disclosure, chi-squared methods are to be preferred over entropy-based methods. Moreover, methods that are similar but not identical to chi-squared methods are to be preferred over methods that are similar but not identical to entropy-based methods. The entropy ranking is based on the amount of disorder for a given distribution of values of the attributes for a variable:

$$Entropy = \sum_{c_j \in dom(y)} -\frac{|\sigma_{y=cc_j}S|}{|S|} \log_2 \frac{|S|}{|\sigma_{y=c_j}S|}$$

Briefly, when the entropy change from one splitting on one variable is smaller than that of splitting by another variable, the information gain is:

$$InformationGain = Entropy - \sum_{v_{i,j} \in dom(a_i)} \frac{|\sigma_{a_i=v_{i,j}}S|}{|S|} * Entropy$$

Gain Ratio is the information gain divided by the split information used to "normalize" it:

$$GainRatio = \frac{InformationGain}{Entropy}$$

The information Gain is typically calculated first and then, preferably for appreciable (nonzero) entropy, the Gain Ratio may be calculated.

With reference to block 402 of FIG. 4, a tree diagram such as the tree 300 (FIG. 2) is generated from mined data. At block 403 (FIG. 4), a population 108 (FIG. 6, to be described in greater detail hereinafter) and a target value 107 are obtained from a top node or field (or both) of the tree diagram. The population and the target value may identify, for example, a most important variable associated with the tree. The population may be indicative, for example, of a number or quantity of records. The population and the target value are stored (FIG. 4, block 404) by appending the population and the target value to a listing of sequential top node parameters in a computer readable memory device.

At block 405, the top node or field is removed from the tree diagram. If any nodes remain in the tree diagram, then the removal of the top node or field creates a new tree diagram with a next top node. For example, upon a first or initial execution of block 405, this top node or field may include the first sequential node 305 (FIG. 3A). The new tree diagram is created from the tree 300 (FIG. 2) by removing the first sequential node 305 (FIG. 3A) or the fields contained therein from the tree, leaving the second sequential node 307 (FIG. 3B) as the next top node. At block 406 (FIG. 4), a test is performed to ascertain whether or not the new tree diagram contains any nodes. If not, the program advances to block 408 (to be described in greater detail hereinafter).

The affirmative branch from block 406 leads to block 407 where a population and a target value are obtained from a top node or a top field (or both) of the new tree diagram. The program then loops back to block 404. In this manner, the operations of blocks 404, 405, 406 and 407 are recursively repeated using a next sequential node (such as second sequential node 307 of FIG. 3B) as the new top node, thus using the new top node to find a next most important variable. In this way, a listing of sequential top node parameters is obtained from the tree 300 of FIG. 2 as was previously described with reference to FIGS. 3A and 3B. The population and the target value are stored (FIG. 4, block 404) by appending the population and the target value to a listing of sequential top node parameters in a computer readable memory device. Block 405 (FIG. 4) is recursively or repeatedly performed for each of a plurality of top node or field removals from the tree diagram as was previously described in connection with FIGS. 2, 3A and 3B.

Figure 7:
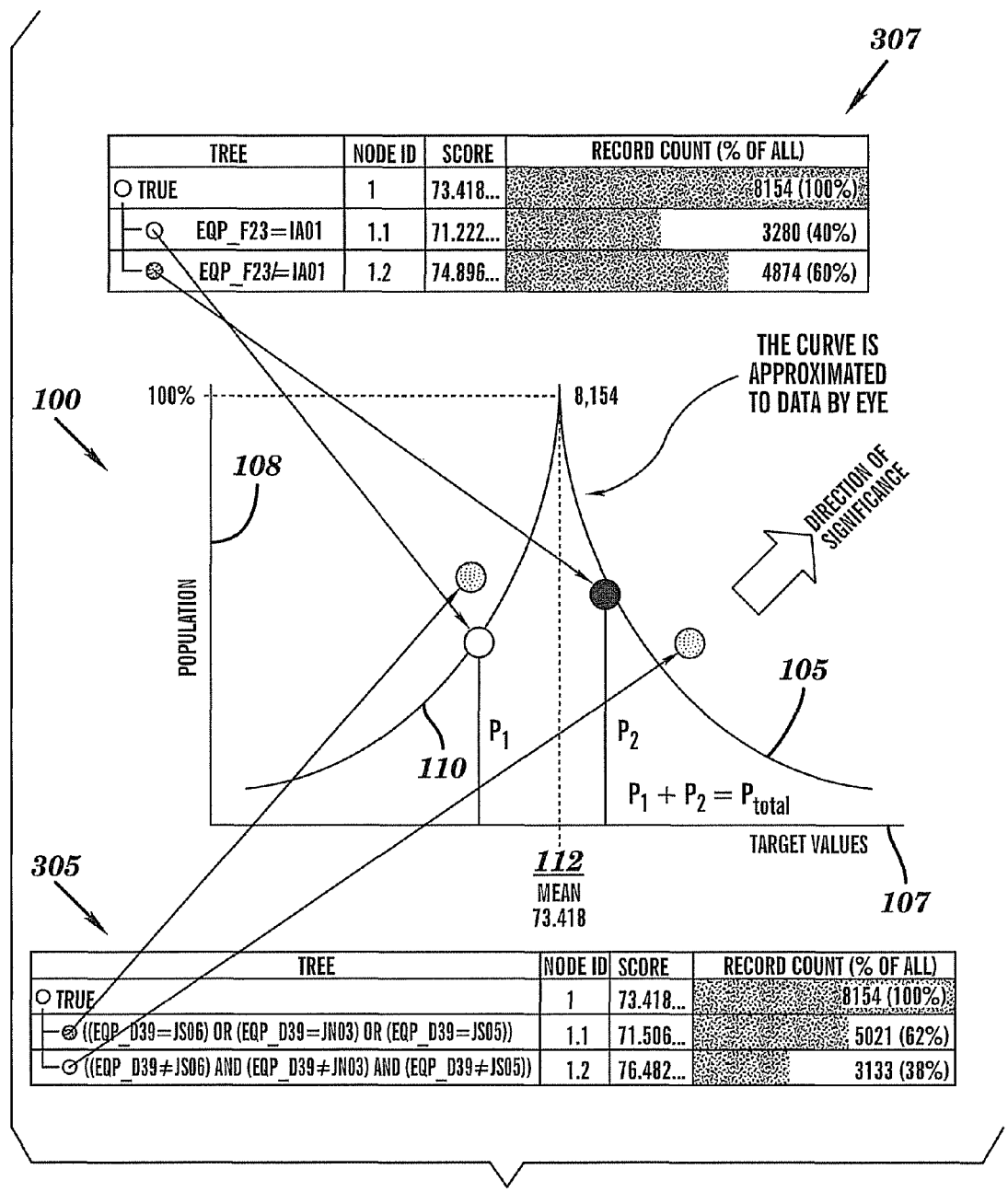
FIG. 7 is a diagram depicting interrelationships among the illustrative tree cusp curve of FIG. 6 and the exemplary tree diagrams of FIGS. 3A and 3B.
Figure 8:
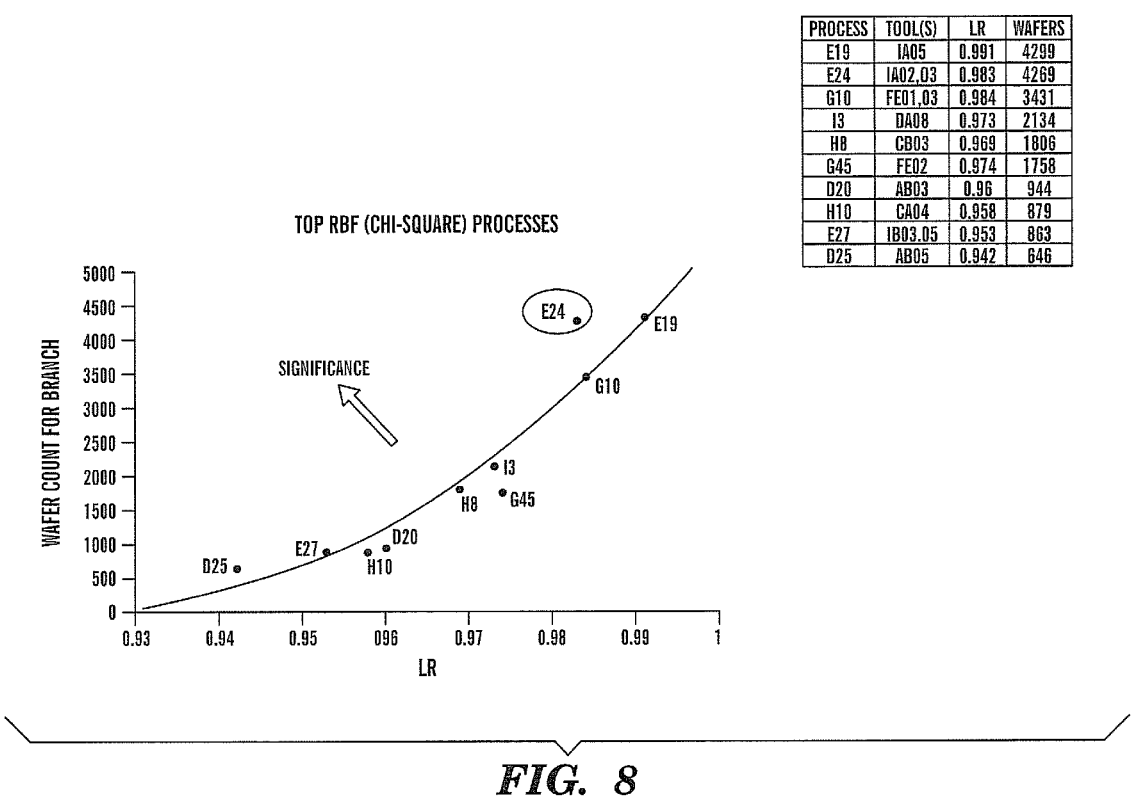
FIG. 8 shows a second illustrative tree cusp curve comprising a left branch on which a generated tree diagram has been plotted according to the methods described in FIG. 4 using chi-squared variable rankings.
Figure 9:
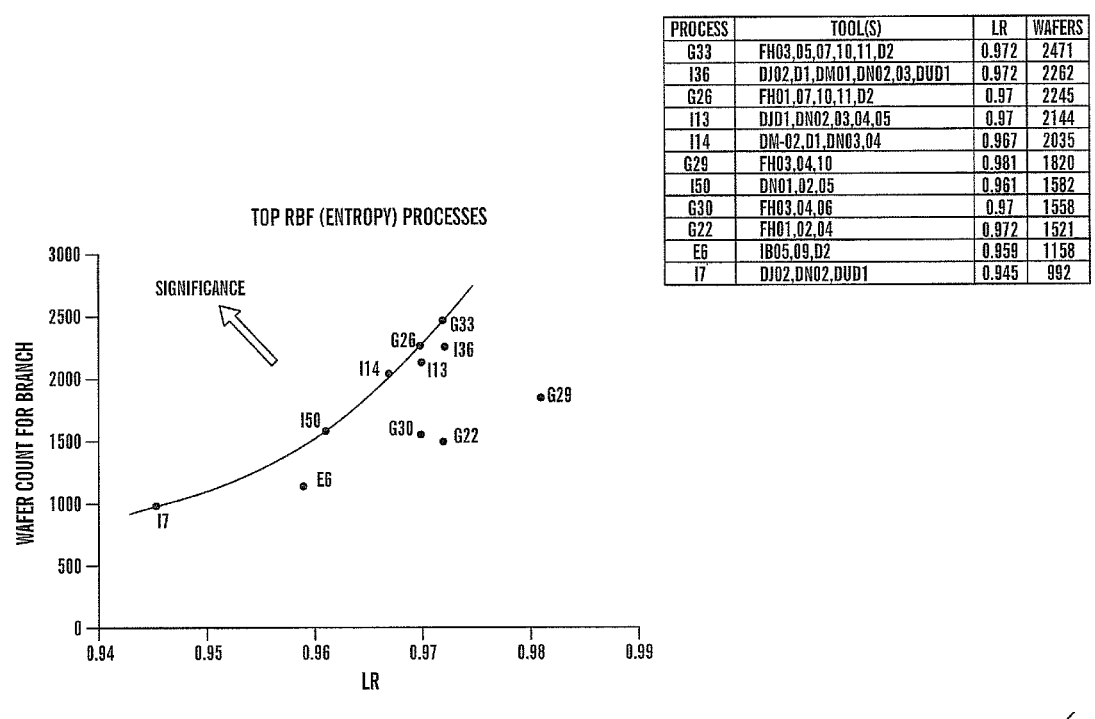
FIG. 9 shows a third illustrative tree cusp curve comprising a left branch on which a generated tree diagram has been plotted using entropy-based variable rankings.

The negative branch from block 407 (FIG. 4) leads to block 408. In essence, after blocks 404-407 (FIG. 4) are repeated to completion among a plurality of variables in the tree diagram as determined at block 406, the procedure advances to block 408 where the listing of sequential top node parameters is plotted on a tree cusp curve 100 (FIG. 6, to be described in greater detail hereinafter) using at least one of a left branch 110 of the tree cusp curve or a right branch 105 of the tree cusp curve 100. Basically, the tree cusp curve 100 is a chart that displays a population 108 or a number of records (or both) as a function of a target value 107. Additional examples of tree cusp curves are shown in FIGS. 7-9, to be described in greater detail hereinafter.

Referring now to block 409 of FIG. 4, the tree cusp curve is used to provide a graphical user interface enabling a visual identification of one or more fields which affect a greatest number of records, or one or more fields which affect a least number of records, or both, based upon a magnitude of departure of the one or more fields from a norm as displayed on the tree cusp curve.

Block 401 of FIG. 4 may, but need not, be performed using a radial basis function network (RBFN) with chi-square ranking for feature selection. For example, IM4D offers a selection of several different data mining methods, one of which utilizes RBFNs as a predictor method. RBFN is a special case of a neural network with similarities or equivalency to a type of support vector machine. The similarity of the RBFN structure to that of other neural networks is evident with reference to FIG. 5 which depicts an illustrative RBFN 600. RBFN 600 utilizes a plurality of input variables 601 denoted as $P_i$ to $P_n$. The plurality of input variables 601 are individually "fed" into a plurality of radial basis functions (RBFs) 603 which comprise a hidden nonlinear layer of the RBFN 600. The outputs of the RBFs 603 are combined linearly by an output layer 605. It is unusual for an RBFN to have more than one hidden layer in contrast to other neural networks which may have several or more hidden, and output, layers—all nonlinear.

RBFs 603 represent Gaussian radial basis functions in a hidden network layer, in contrast to the linear nodes of output layer 605 which generate output classifications or discrete real values. A useful way to think of the hidden layer of RBFs 603 is that each hidden unit essentially represents a particular point in input space, and its output, or activation, for a given instance depends on the distance between its point and the instance. The closer these two points, the stronger the activation. RBFN 600 may be conceptualized as addressing a "curve-fitting (approximation) problem in a high-dimensional space" using "nonlinear layered feedforward networks." Alternatively or additionally, RBFN 600 may be regarded as networks using exponentially decaying localized nonlinearities (e.g. Gaussian functions) to construct local approximations to nonlinear input-output mapping." This is in contrast to neural networks which provide a global approximation with the possibility of exhibiting local minima. With this ability, RBFN 600 is capable of solving an issue known as the Exclusive OR problem.

Cover's theorem states that a "complex pattern-classification problem cast in high-dimensional space nonlinearly is more likely to be linearly separable than in a low dimensional space." Therefore, many nodes may be needed in the hidden layer to best approximate the data; in fact, one RBF of RBFs 603 is centered at each data point $$F(x) = \sum_{i=1}^{N} w_i \varphi(\|x - x_i\|),$$

where the Euclidean norm between the parallel lines indicates the distance of each of N data points, $x_i$, from the vector x. And where:

$$\varphi(r) = \exp\left(-\frac{r^2}{2\sigma^2}\right),$$

for r>0 and σ>0.1

In the above equation, σ is an effective width of the radial basis function. However, practical considerations (computation) would reduce the number of RBFs to a much lower amount than one for each data point. By so doing, the hypersurface approximating function no longer goes through each of the data points (i.e. no longer has RBFs centered at each data point). Each RBF unit or center must therefore be strategically located and sized. The learning mechanism, and optimization, for locating the nonlinear, hidden layer RBF centers is separate from, and slower, than computing the linear output layer weights. The RBF centers may be obtained randomly, or by self-organized (e.g. k-nearest neighbor), or by a supervised method. The output layer uses supervised learning (e.g. least mean square). It may be desirable to normalize each basis function so that there are no gaps in coverage throughout hyperspace.

Some data mining experts have cautioned users as to various drawbacks associated with RBFNs: First, an RBFN gives every attribute the same weight because all are treated equally in the distance computation and cannot deal effectively with irrelevant attributes—unlike multilayer perceptions. Secondly, in order to represent a mapping to some desired degree of smoothness, the number of radial-basis functions required to span the input space adequately may have to be very large. But RBFNs have advantages, too. RBF networks are capable of fast learning and reduced sensitivity to the order of presentation of training data. In summary, there is usually just one hidden layer in the network comprised of nonlinear (typically Gaussian) nodes. Mapping the data nonlinearly into a high-dimensional space makes it easier to find a linear separation of classes than in a low-dimensional space (Cover's Theorem). Key differences from neural networks are include: RBFs always cluster whereas neural networks are defined with one node per training point and have to have clustering added. Extracting centers using k-means clustering is a method associated with RBFNs. This clustering feature is evident in IM4D where the number of regions (selectable by the miner) are formed for the n points in p-dimensional space. In the IM4D version, the input variables 601 within each region can be ranked by chi-square or entropy measures.

RBFN 600 has features similar to both clustering and neural networks. Each 'cluster' is centered at an RBF region with a, typically, Gaussian 'distance measure' capturing points within its radius. The RBF method can use categorical or numeric input (or both) and output. The regions are found automatically by the RBF algorithm and can be adjusted in the minimum number of points defining a region as well as the quantity of regions to include in the model. If these are not specified, the software uses default values.

Figure 6:
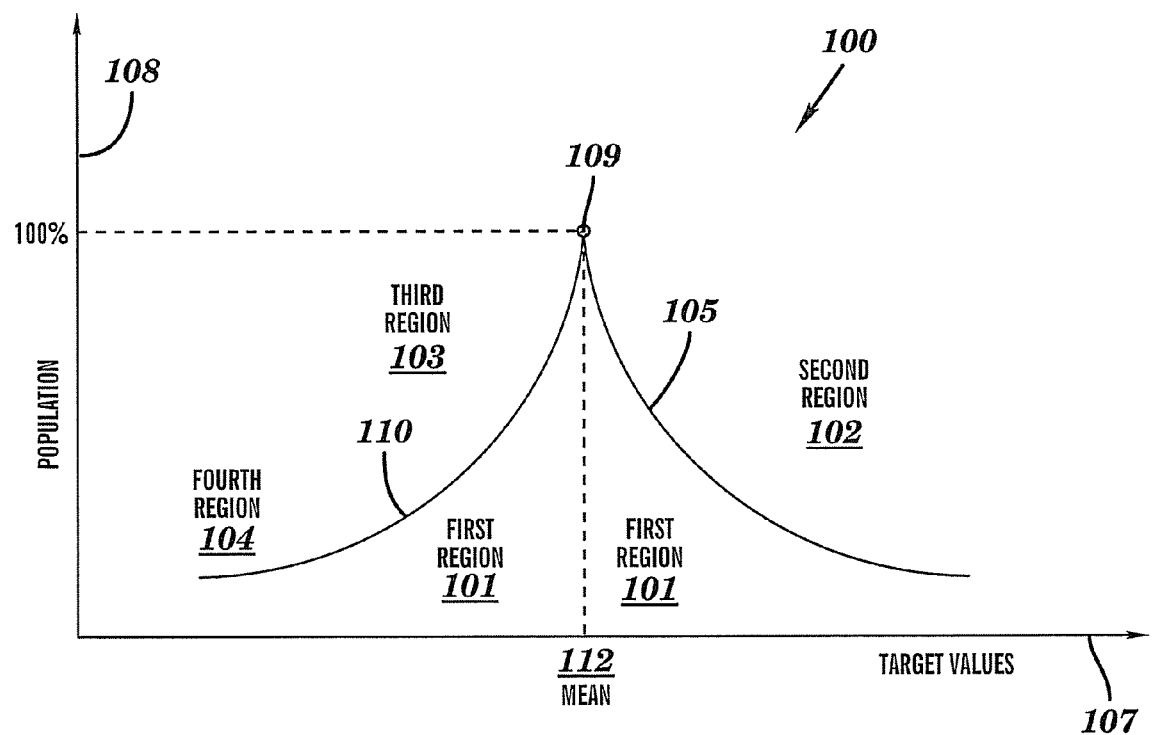
FIG. 6 shows a first illustrative tree cusp curve for providing an enhanced graphical user interface that facilitates a visual identification of one or more data fields based upon a magnitude of departure of the one or more data fields from a norm.

FIG. 6 shows a first illustrative tree cusp curve 100 for providing an enhanced graphical user interface that facilitates a visual identification of one or more data fields based upon a magnitude of departure of the one or more data fields from a norm. In general, a distinct disadvantage with respect to prior art knowledge discovery problems, as opposed to predictive analytics where there are roughly as many variables as records, is the lack of diagnostic methods, such as gain or lift curves, from which to compare a plurality of data mining methods. One prior art approach, known to those of ordinary skill in the field of data mining, is the hypergeometric method for categorical variables. Unfortunately, the hypergeometric method is appropriate for classification problems, whereas the desired target for purposes of various embodiments disclosed herein may be continuous. One could bin a continuous target for classification, but often a binning boundary, or cutoff, is difficult to determine in situations where electrical test parameters are involved.

The tree cusp curve 100 of FIG. 6 presents a novel approach for ranking variables in data mining. Rather than simply ranking the variables using sequential top nodes from the tree, a plurality of nodes from a tree (i.e., tree 300, FIG. 2) are plotted on a chart that displays a population 108 as a function of target value 107. For example, the population 108 may represent a number or quantity of records. The population 108 may be plotted with reference to a y-axis of the tree cusp curve 100, whereas the target value 107 may be plotted with reference to an x-axis of the tree cusp curve 100. In an illustrative operational environment of semiconductor fabrication, the population 108 represents a number of semiconductor wafers whereas the target value 107 represents one or more measured electrical parameters for the wafers. The tree cusp curve 100 provides a graphical user interface that facilitates visual judging and assessment of mining results by one or more end users.

The tree cusp curve 100 has the shape of a cusp where an apex 109 is defined by a mathematical mean 112 of the population 108. Any rules obtained from the tree 300 (FIG. 2) will involve a smaller number than a sum total of the population 108 (FIG. 6) due to the splitting nature of nodes. Rules which result in target values 107 less than the mean 112 indicated by the apex 109 will be represented by a cloud of points roughly on or below a left branch 110 of the tree cusp curve 100. Complementarily, rules which result in target values 107 higher than the mean 112 indicated by the apex 109 follow on or below a right branch 105 of the tree cusp curve 100. Admittedly, a visual interpretation of tree cusp curve 100 may be subjective in situations where the curve is effectively drawn by the eye of a user. Accordingly, splines or other methods may be employed to less ambiguously draw the left branch 110 and the right branch 105 of the tree cusp curve 100.

If there is a large effect due to a single process or combination of processes, this effect will be represented as a point above the tree cusp curve 100 towards the upper left or right extremes of the chart depending on whether the target values of interest are below or above the mean 112. For example, a point (i.e., a candidate) representing low yield would follow the left branch 110 if the target values 107 represent a percent yield. However, if the target values 107 represent yield loss (=1−yield), then low yield would follow the right branch 105. Most of the rules obtained by the tree 300 (FIG. 2) lie in a first region 101 (FIG. 6) below the tree cusp curve 100. The points (candidates) of most interest are therefore those lying on or above the tree cusp curve 100, such as those candidates which lie in a second region 102 above the right branch 105, a third region 103 above the left branch 110, or a fourth region 104 also above the left branch 110 but at a greater distance from the apex 109 than the third region 103.

Points situated above the tree cusp curve 100 represent a greater number of instances of a given departure from the mean 112 relative to points situated below the tree cusp curve 100. Accordingly, if any points lie above the tree cusp curve 100, they would draw more interest from an end user relative to points below the tree cusp curve 100. For example, points that are situated in the second region 102 may be of interest, especially if these points are at a relatively great distance from right branch 105 relative to other points.

Points that are situated in the third region 103 affect a greater number of records relative to points that are situated in the fourth region 104. However, points situated in the third region 103 represent a smaller departure from the mean 112 relative to points that are situated in the fourth region 104. Accordingly, points situated in the fourth region 104 may be employed for purposes of anomaly detection. In an illustrative context of semiconductor fabrication, points situated in the fourth region 104 represent a few maverick wafers that exhibit an electrical parameter revealing a large departure from the mean 112. If a phenomenon being mined affects only a small percentage of the wafers, then points towards lower population 108 values of the tree cusp curve 100 would be of interest. Illustratively, these points may include points in proximity to a rightmost portion of the right branch 105, or points in proximity to a leftmost portion of the left branch 110, or points that are in proximity to either the leftmost portion of the left branch 110 or the rightmost portion of the right branch 105. If the yield loss is of a smaller degree but affecting a sizeable percentage of the wafers, then points near the apex 109 of would be of greater interest than points in proximity to the leftmost portion of the left branch 110 or the rightmost portion of the right branch 105. In this manner, the tree cusp curve 100 of FIG. 6 facilitates an end-user quickly ascertaining which of a plurality of rules from the tree 300 (FIG. 2) are of most interest for the situation being modeled.

FIG. 7 is a diagram depicting interrelationships among the illustrative tree cusp curve of FIG. 6 and the exemplary tree diagrams of FIGS. 3A and 3B. More specifically, FIG. 7 shows the manner in which the illustrative tree cusp curve of FIG. 6 is prepared using the exemplary tree diagrams of FIGS. 3A and 3B. Each variable gets its own tree and is subtracted from the pool. Each tree has only one level (like a 1R stump). Two level trees give process interactions (not shown), wherein the second nodes are not subtracted from the pool. In the present example, the mean 112 is 8.154. EQP_F23=IA01 yields $p_1$ near left branch 110 and EQP_F23≠IA01 yields $p_2$ near right branch 105. Note that $p_1+p_2=p_{total}$. Also note that tree cusp curve 100 may be approximated to data from first sequential node 305 (FIG. 3A) and second sequential node 307 by eye.

FIG. 8 shows a second illustrative tree cusp curve 700 comprising a left branch on which a generated tree diagram has been plotted according to the methods described in FIG. 4 using chi-squared variable rankings. To reveal the manner in which one or more best points (candidates) are visually identified as "outliers" from the tree cusp curve 700, observe that a pair of tools denoted as IA02 and 03 for a process E24 have a markedly lower value of an electrical parameter LR for a sizable number of wafers (in this example, 4269 wafers). Note that a point E24, corresponding to the tools IA02 and 03 from the process E24, is situated relatively far from the tree cusp curve 700 as compared with other points such as E19, G10, I3, H8, G45, D20, H10, E27 and D25. These other points represent tool-process combinations other than tools IA02 and 03 being combined with process E24. The cusp curve 700 was generated from an actual, real world example in which a problem with the tool-process combination of IA02-03 and E24 was discovered using the cusp curve 700 before discovering the problem using conventional engineering methods. This proves the utility of the combined approach described in FIGS. 2-6) utilizing RBFN 600 (FIG. 5) for feature selection, followed by a classification tree 300 (FIGS. 2, 3A and 3B) for rule formation and the tree cusp curve 100 for visualization of one or more process/tool combinations to which a problem may be attributed.

FIG. 9 shows a third illustrative tree cusp curve 800 which is similar to the second illustrative tree cusp curve 700 of FIG. 8, with the exception that the tree cusp curve 800 (FIG. 9) has been plotted using entropy-based variable rankings instead of chi-squared variable rankings. Whereas the departure of point E24 from a norm defined by the tree cusp curve 700 of FIG. 8 was easy to observe, this is not the case with respect to the entropy-based tree cusp curve 800 of FIG. 9. Considering tree cusp curve 800, it may be observed that no point is situated substantially above the curve. Accordingly, a user is unable to identify one or more potentially problematic process/tool combinations as was the case with the tree cusp curve 700 of FIG. 8. One reason why the tree cusp curve 800 of FIG. 9 does not readily reveal outlying points as readily as the tree cusp curve 700 of FIG. 8 is that semiconductor fabrication involves a large number of tools for a plurality of highly ranked processes. This operational setting reveals the inherent bias in entropy-based rankings for highly-attributed variables during feature selection.

Figure 10:
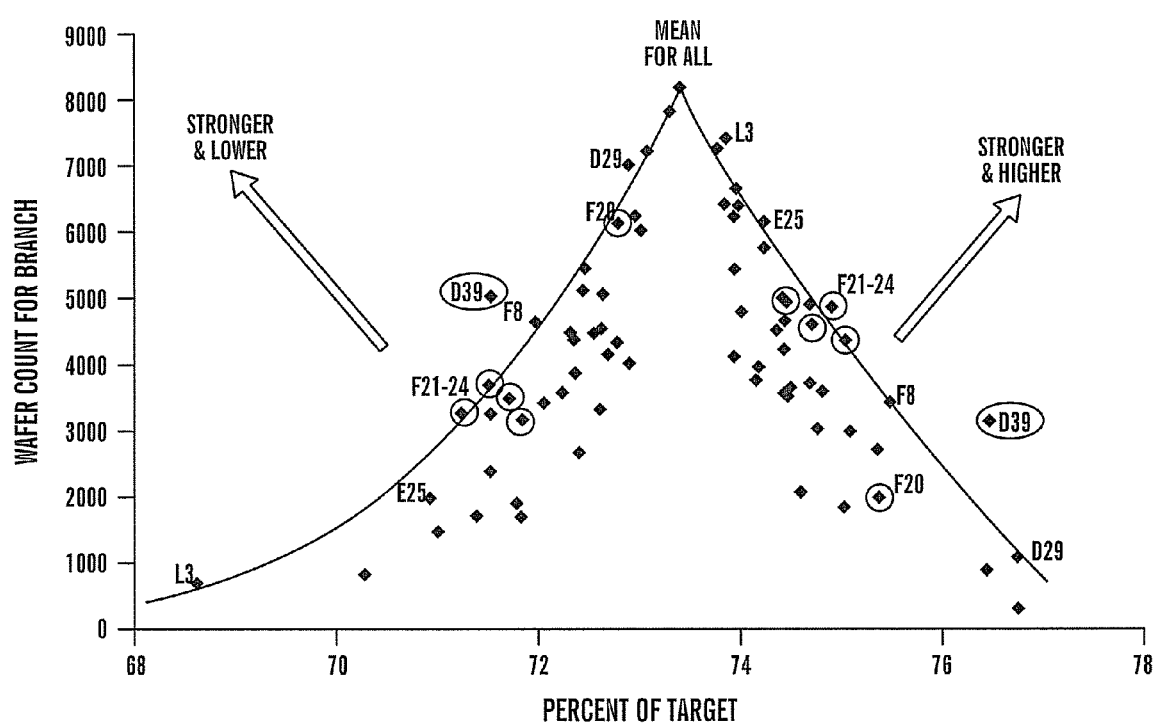
FIG. 10 shows a fourth illustrative tree cusp curve on which a generated tree diagram has been plotted according to the methods described in FIG. 4.

FIG. 10 shows a third illustrative tree cusp curve 900 on which a generated tree diagram has been plotted according to the methods described in FIG. 4. The tree cusp curve 900 illustrates plotting both the left branch 110 (FIG. 6) and the right branch 105 within a top node (FIGS. 3A and 3B) of each tree stump obtained for each selected feature. The tree cusp curve 900 immediately draws attention to a point exhibiting the farthest departure from the curve: D39. However, also note the strong clustering of a group of points labelled F21-24. Although sought out and labeled in 20/20 hindsight, this grouping of fields with its nearness to the curve may represent a phenomenon deserving of further attention. For example, this grouping all shares the same prefix. Rankings generated by the RBFN 600 (FIG. 5) would further elicit suspicion and attention. A "sanity check" on the D39 finding would be to see how many attributes (process tools) were associated with it. The D39 finding would be a potential issue for an engineering team to investigate further.

Figure 11:
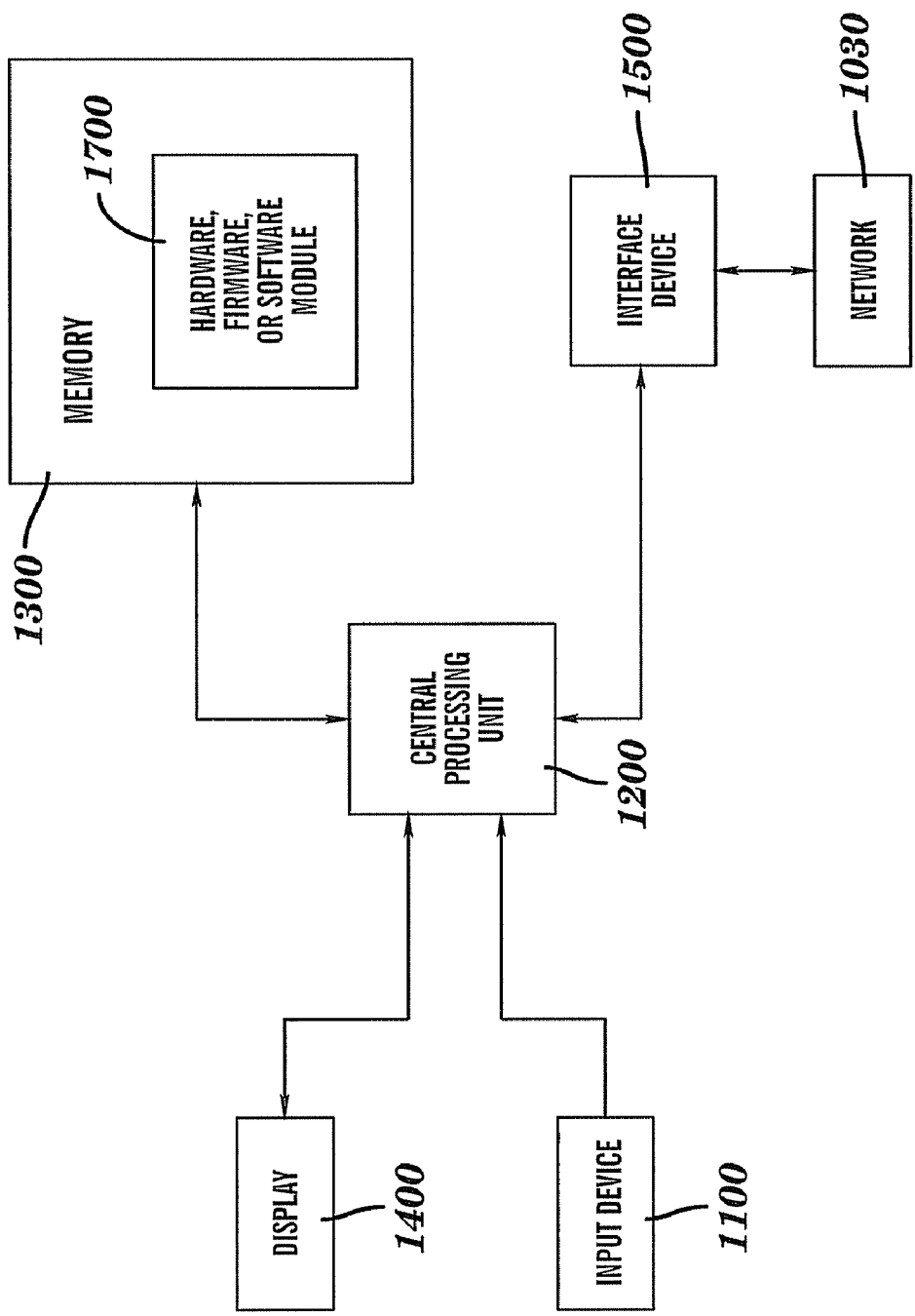
FIG. 11 is a block diagram illustrating an exemplary system on which the methods of the present invention may be performed.

FIG. 11 is a block diagram illustrating an exemplary system on which the methods of the present invention may be performed. It is to be clearly understood that FIG. 11 is illustrative in nature, as other systems, devices, or apparatuses not shown in FIG. 11 may also be used to implement embodiments of the invention. The data processing system 1000 includes an input device 1100, a central processing unit ("CPU") 1200, memory 1300, a display 1400, and an interface device 1500. The input device 1100 may include a keyboard, a mouse, a trackball, or a similar device. The CPU 1200 may represent a single processing unit, or a plurality of individual processing devices that are operatively coupled together. The CPU 1200 may, but need not, include dedicated coprocessors and memory devices. The memory 1300 may include RAM, ROM, databases, or disk devices. The display 1400 may include a computer screen, terminal device, a hard-copy producing output device such as a printer or plotter, or a similar device. The interface device 1500 may include a connection or interface to a network 1030 such as the Internet, an intranet, a local area network (LAN), or a wide area network (WAN).

Optionally, the data processing system 1000 may be linked to other data processing systems over the network 1030. These other data processing systems may, but need not, include an equipment analysis application. Illustratively, in the field of semiconductor fabrication, this equipment analysis application may include a tool/chamber commonality analysis application, a wafer randomization analysis program, or any other type of application capable of identifying variations attributable to equipment. Of course, the data processing system 1000 may contain additional software and hardware, a description of which is not necessary for understanding the invention. The data processing system 1000 has stored therein data representing sequences of instructions which, when executed, cause the methods described hereinafter to be performed. Thus, the data processing system 1000 includes computer executable programmed instructions for directing the system 100 to implement any of the embodiments of the present invention.

The programmed instructions may be embodied in at least one hardware, firmware, or software module 1700 resident in the memory 1300 of the data processing system 1000. Alternatively or additionally, the programmed instructions may be embodied on a computer readable medium (such as a CD disk or floppy disk) which may be used for transporting the programmed instructions to the memory 1300 of the data processing system 1000. Alternatively or additionally, the programmed instructions may be embedded in a computer-readable, signal or signal-bearing medium that is uploaded to the network 1030 by a vendor or supplier of the programmed instructions, and this signal or signal-bearing medium may be downloaded through an interface 1500 to the data processing system 1000 from the network by end users or potential buyers.

Figure 12:
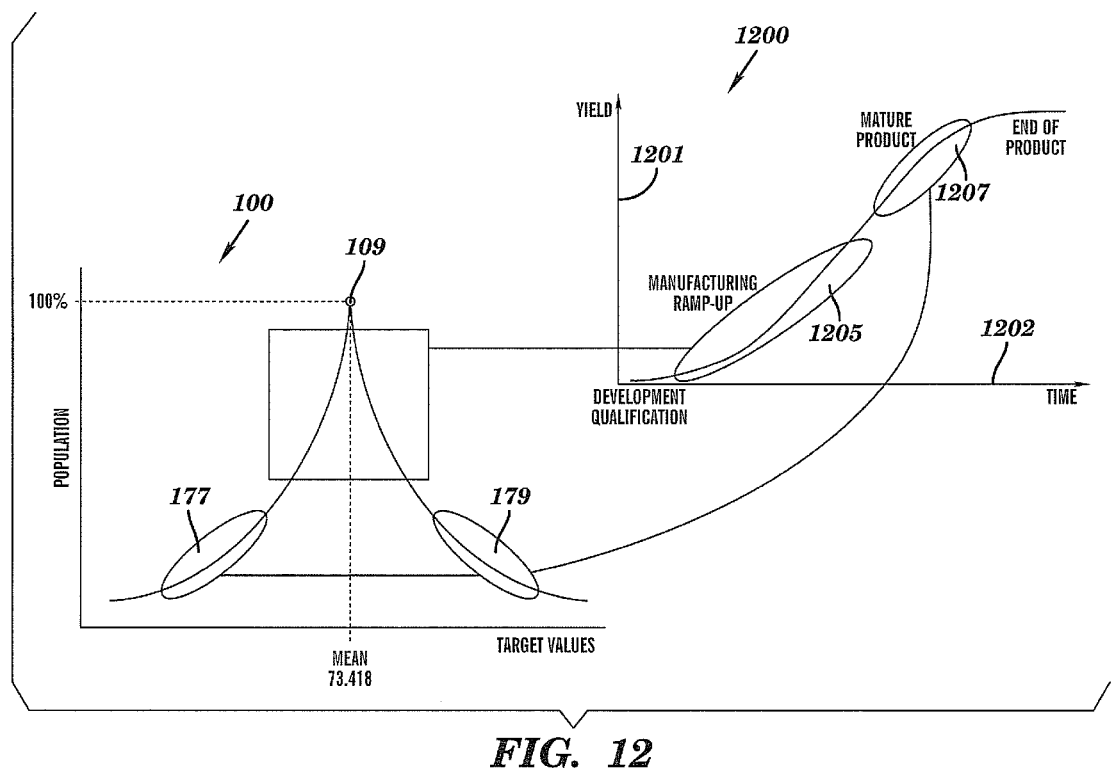
FIG. 12 is a product development curve showing yield as a function of time for a manufactured product.

FIG. 12 is a product development curve 1200 showing yield 1201 as a function of time 1202 for a manufactured product. Essentially, the tree cusp curve 100 of FIG. 6 is applied in accordance with a product stage as indicated on the product development curve 1200 of FIG. 12. During relatively early stages of developing a product as indicated in a manufacturing ramp-up 1205 region of the product development curve 1200, one is looking for major influences in increasing the yield 1201, so points relatively close to a cusp (i.e., apex 109, FIGS. 6 and 12) of the tree cusp curve 100 are of greater interest than points that are not as close to the apex 109. During a mature product stage denoted as a mature product 1207 region of product development curve 1200 (FIG. 12), the yield 1201 is unlikely to change greatly except for some mavericks which can be detected and chased down before they become a much greater problem, so a tail region of the curve, such as tail regions 177 and 179 (FIG. 12) are of greater interest than the apex 109.

In applying the techniques disclosed herein, some criterion may be employed to determine how many ranked fields to use in the previously described tree cusp curve method. For example, one may employ all ranked fields or a limited number of ranked fields, or one may utilize a "knee" that is present in a curve of the RBF fields. All ranked fields could be utilized, or the number of ranked fields that are utilized may be left to the user's discretion.

Details regarding various tree methods, including "splitting criteria" that are commonly used by these tree methods to decide upon a field used for the top node, are matters within the knowledge of those having ordinary skill in the relevant art. The techniques disclosed herein may be utilized in the context of mining a numeric (continuous or discrete) target field using categorical (or categorical and numeric) predictor fields. Device yield (target) using process steps & tools (predictors) has been provided previously for purposes of illustration. Any of two or more techniques may be utilized to provide input fields for the tree curve method described previously: (1) An initial data mining method (RBF network, neural network, or support vector machine) that only ranks categorical fields against a predictor to provide one or more input fields for the tree curve method; or (2) A feature selection method to create a list of important fields.

Although some of the foregoing examples were drawn from the field of semiconductor processing, this is only for purposes of illustration, as it is to be clearly understood that the invention encompasses any operational environment involving data mining.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for performing data mining, the method including:

mining data using any data mining method which ranks each of a plurality of variables;

generating a tree diagram from the mined data including the variables using a tree mining method;

obtaining a population and a target value from a top node or a top field of the tree diagram;

storing the population and the target value by appending the population and the target value to a listing of sequential top node parameters;

removing the top node or top field from the variables used in the tree mining method to create a new tree diagram formed with all or a subset of the variables used in the tree mining method, the new tree diagram having a next top node or a next top field;

repeatedly obtaining a next population and a next target value for the next top node or the next top field, appending the next population and the next target value to the listing of sequential top node parameters, and removing the top node or top field from the variables used to form a new tree diagram, until the new tree diagram does not contain any more nodes or fields; and plotting the listing of sequential top node parameters on a tree cusp curve using at least one of a left branch of the tree cusp curve or a right branch of the tree cusp curve wherein the tree cusp curve provides a graphical user interface enabling visual identification of one or more fields which affect a greatest number of records, or one or more fields which affect a least number of records, based upon a magnitude of departure of the one or more fields from a norm as displayed on the tree cusp curve.

2. The method of claim 1 wherein the population represents a quantity or number of records, and the target value represents a measured parameter.

3. The method of claim 1 wherein the top node is obtained via a chi-squared method implemented using a radial basis function network (RBFN).

4. The method of claim 1 wherein the tree cusp curve displays a population as a function of a target value.

5. The method of claim 1 wherein the tree cusp curve is formed in a shape of a cusp having an apex, and wherein the apex is defined by a mathematical mean of the population.

6. The method of claim 1 wherein the listing of sequential top node parameters comprises a hierarchy of rules ranked by a level of importance.

7. The method of claim 1 wherein mining data is performed using a method that is similar but not identical to the chi-squared method, or performed using a method that is closer to the chi-squared method than to an entropy method;

wherein the chi-squared method is based upon ranking an attribute of a variable by a sum of squares indicative of a difference between an observed value for the attribute and an expected value for the attribute divided by the expected value for the attribute; and wherein the entropy method is based upon an amount of disorder for a given distribution of values of an attribute of a variable.

8. The method of claim 1 wherein the population and the target value identify a most important variable associated with the tree diagram.

9. The method of claim 3 wherein the RBFN comprises a network using a plurality of exponentially decaying localized nonlinearities to construct a plurality of local approximations to a nonlinear input-output mapping.

10. The method of claim 1 wherein the population represents a number of semiconductor wafers and the target value represents one or more measured electrical parameters for the wafers.

11. A computer program product for performing data mining, the computer program product including a storage medium readable by a processing circuit and storing instructions for execution by the processing circuit for facilitating a method including:

mining data using a chi-squared method for ranking each of a plurality of variables;

generating a tree diagram from the mined data;

obtaining a population and a target value from a top node or a top field of the tree diagram;

storing the population and the target value by appending the population and the target value to a listing of sequential top node parameters;

removing the top node or top field from the tree diagram to create a new tree diagram having a next top node or a next top field;

repeatedly obtaining a next population and a next target value for the next top node or the next top field, appending the next population and the next target value to the listing of sequential top node parameters, and removing the top node or top field from the new tree diagram, until the new tree diagram does not contain any more nodes or fields; and plotting the listing of sequential top node parameters on a tree cusp curve using at least one of a left branch of the tree cusp curve or a right branch of the tree cusp curve wherein the tree cusp curve provides a graphical user interface enabling visual identification of one or more fields which affect a greatest number of records, or one or more fields which affect a least number of records, based upon a magnitude of departure of the one or more fields from a norm as displayed on the tree cusp curve.

12. The computer program product of claim 11 wherein the population represents a quantity or number of records, and the target value represents a measured parameter.

13. The computer program product of claim 11 wherein the top node is obtained via a chi-squared method implemented using a radial basis function network (RBFN).

14. The computer program product of claim 11 wherein the tree cusp curve displays a population as a function of a target value.

15. The computer program product of claim 11 wherein the tree cusp curve is formed in a shape of a cusp having an apex, and wherein the apex is defined by a mathematical mean of the population.

16. The computer program product of claim 11 wherein the listing of sequential top node parameters comprises a hierarchy of rules ranked by a level of importance.

17. The computer program product of claim 11 wherein mining data is performed using a method that is similar but not identical to the chi-squared method, or performed using a method that is closer to the chi-squared method than to an entropy method;

wherein the chi-squared method is based upon ranking an attribute of a variable by a sum of squares indicative of a difference between an observed value for the attribute and an expected value for the attribute divided by the expected value for the attribute; and wherein the entropy method is based upon an amount of disorder for a given distribution of values of an attribute of a variable.

18. The computer program product of claim 11 wherein the population and the target value identify a most important variable associated with the tree diagram.

19. The computer program product of claim 13 wherein the RBFN comprises a network using a plurality of exponentially decaying localized nonlinearities to construct a plurality of local approximations to a nonlinear input-output mapping.

20. The computer program product of claim 11 wherein the population represents a number of semiconductor wafers and the target value represents one or more measured electrical parameters for the wafers.

* * * * *